Nov. 13, 1928.  
N. C. JOHNSON  
1,691,721  
PROCESS OF AND MATERIAL FOR TREATING CONCRETE  
Filed April 2, 1926

Inventor  
Nathan C. Johnson  
By his Attorneys  
Ward, Crosby & Smith

Patented Nov. 13, 1928.

1,691,721

UNITED STATES PATENT OFFICE.

NATHAN C. JOHNSON, OF ENGLEWOOD, NEW JERSEY.

PROCESS OF AND MATERIAL FOR TREATING CONCRETE.

Application filed April 2, 1926. Serial No. 99,330.

This invention relates to products for surfacing concrete and to processes for making and utilizing such products.

The use of concrete has been greatly restricted by reason of unsightly form marks which in the past could only be removed or obscured by expensive or undesirable methods and also by reason of the peculiar color and texture of the concrete. Heretofore, in attempts to remove the undesirable surface marks, strong mineral acids or other chemicals have been used for scrubbing down set or hardened concrete, and in other ways for giving a desirable appearance by exposing the aggregate and eating away the cement surface, but this is in some cases impractical. In certain localities the color and nature of the aggregate used in the concrete mixture is unsighly and unsuitable for decorative purposes. Therefore, highly desirable effects often cannot be realized merely by treating the concrete surfaces to expose the aggregate present therein. Also in some instances it is desired to provide the concrete surface with partially exposed selected forms of aggregate material integrally cast with the concrete. Or it may be desired to have the exposed stones or other particles at the concrete surface arranged in accordance with a predetermined regular or partially regular pattern.

With the present invention rough textured concrete surfaces of a wide variety of appearances may be provided in a reliable, cheap and easy manner without reducing or endangering the strength of the concrete body and independently of the character of the aggregate in the body of the concrete or other materials of the concrete mixture. This is very desirable for many purposes, such for example as to give a pleasing rough finish, pebble or rock-like surface, to concrete, particularly where the aggregate used in the body of the concrete is not of a desirable appearance. Such a surface may also be used in providing for a bonding action of predeterminable effectiveness with plaster or other portions of a concrete structure. Another aim of this invention is the elimination of the fine outer surface layer of a concrete body which is normally overrich in cement, since in the usual concrete structures harmful cracks result from this rich cement surface because it has a different coefficient of expansion from the body of the concrete.

According to the preferred form of this invention, a layer of selected concrete aggregate is secured to a suitable base or backing such as an inexpensive cloth or paper, by an adhesive. The adhesive used preferably includes a gum substance incorporated with suitable "medication" for inhibiting the normal setting action of a concrete mixture to a limited depth when applied to the surface thereof. In using this product, an area of the same, including the aggregate thereon, is secured to the concrete forms and the concrete mixture is thereafter poured directly against the layer of aggregate. The concrete is then allowed to set or harden, thus partially enveloping and securing thereto the particles of selected aggregate in the desired predetermined arrangement, whether irregular or according to a predetermined pattern. Meanwhile for a limited depth within the interstices of the layer of selected aggregate, the concrete is inhibited from hardening and accordingly when the forms, together with the adhesive and backing materials are removed, the particles of the aggregate will be found to be free from any hardened covering of cement and their texture and outline will be clearly exposed.

The invention comprises the novel product as above referred to and also the process of manufacturing and applying such product to the treatment of a concrete body.

In the drawings Fig. 1 is a front face view of the product embodying this invention as it appears prior to its application to a concrete body;

Figure 1:
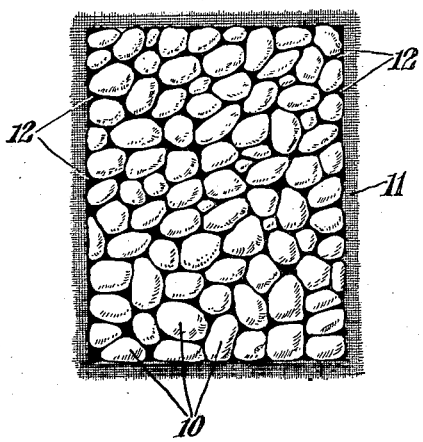

In practicing this invention I preferably make use of a suitable base or backing such as paper or cloth, or in some instances a backing of sheet metal, expanded metal, or wire screening may be used. To this backing I apply a coating of the selected aggregate which may be of the preferred color and any desired size within practical limits, the aggregate particles being firmly attached to the backing by an adhesive material, one example of which will now be described.

A mixture of orange shellac gum and manila gum dissolved in suitable quantities of alcohol and with or without waxes is prepared with the desired consistency to form a tenacious adhesive colloidal vehicle. For this purpose about 2 pounds of the shellac and about 2¼ pounds of the manila gum may be dissolved in about 3 quarts of alcohol. To this colloidal vehicle a suitable reagent or reagents or "medication" is added which will have the property of inhibiting the normal setting action of a concrete mixture to a limited depth when applied to the surface thereof. Among the reagents or "medication" substances which may be used for this purpose are aluminum chloride, magnesium saccharate and magnesium chloride in suitable proportions, such for example as aluminum chloride—¼ oz., magnesium saccharate—6½ oz., magnesium chloride—2 oz., these metallic salts being mixed with a small quantity of water, say one-half pint. A composition made according to this formula and with these amounts will produce about one gallon of the colloidal substance. Greater quantities of the reagents or "medication" will effect greater depths from the concrete surface by reacting with greater quantities of the cement if such action is desired.

While various emulsions or water distensible colloids may be used, it is quite desirable in commercial work that the adhesive vehicle which carries the "medication" substance should be insoluble and/or not distensible except in the alkaline waters, such as are produced in the concrete and pervade the concrete due to the reaction between the water and Portland cement. Further examples of such water insoluble bodies or vehicles are casein either with or without formaldehyde, rosin dissolved in alkali or alcohol, or drying oils and the like. A suitable starch base such as one made of corn starch properly treated to form a viscous, distensible colloid of low solubility may be used. While I have given these as examples of satisfactory adhesive colloidal vehicles, I do not wish to be understood as in any way being limited to only these particular examples.

Many different and widely varying substances may be used as a reagent or "medication"; for example, they may consist either of the mixtures of sugar products, of metallic salts or of glucocides or glucose, or dextrines either with or without metallic salts or metallic salts either with or without other substances.

In forming the product embodying this invention this mixture comprising the colloidal vehicle containing the "medication" substance may be first spread in a relatively thick layer over the fabric or other backing. Thereupon the desired selected aggregate may be sprinkled thereover or carefully arranged upon the backing in accordance with a predetermined pattern. Thereafter the aggregate particles may be firmly pressed part way into the adhesive vehicle, the vehicle then being allowed to dry out, at least sufficiently to form a toughened layer for securing the aggregate to the backing. Care should be taken that the adhesive does not smear over the outer faces of the pebbles or aggregate. The adhesive as above disclosed, has the ability to very firmly secure the aggregate to the backing and furthermore the resulting product may be exposed to ordinary water such as rain water and various weather conditions without injury or loosening of the particles and without interference with the predetermined arrangement of the particles in respect to each other.

The product as thus formed may thereupon be secured to the insides of the forms which are to receive concrete. The usual concrete mixtures may then be poured directly against the layer of aggregate and inasmuch as the surfaces of the aggregates on their inner faces will be clean and ready to bond with cement, it is apparent that the cement in the concrete will be able to firmly attach itself to the aggregate as held in the desired position by the fabric of the backing. However, the concrete while being poured will have a tendency to run into the interstices between particles of the layer of aggregate where, upon removal of the forms, it would ordinarily be too freely exposed to obtain the most pleasing effects. Therefore, in accordance with this invention, during the setting of the cement, the active "medication" substance in the colloidal vehicle as above described will operate to prevent the normal setting action of a very fine surface layer of this cement at these interstices and leave clean side faces on the aggregate particles when the forms are removed. Meanwhile during the setting action of the cement the adhesive colloidal vehicle will become distended by the alkaline waters extruded from the concrete, so that the backing may be readily separated from the particles, leaving the particles exposed but bound into the cement of the concrete upon removal of the forms.

After the forms have been removed in the usual manner, together with the fabric or other backing, the resulting concrete surface may be easily cleaned by alternately hosing and brushing or by either alone. The thin treated surface layer of the concrete within the interstices of the aggregate may thus be easily removed or may be removed by the action of rain washing and weathering.

The "medication" substance acts to prevent the normal setting action of the concrete between the particles but only to a limited and controlled depth and thereby making evident a fine etched appearance between the particles of aggregate, and conferring a pleasing texture and relief. At the same time the surfaces of the aggregate particles are kept free from any covering of cement. Accordingly a solid body of concrete is formed with aggregate particles projecting from the treated facial areas, each particle having a large percentage of its surface exposed and revealing its normal shape, color and appearance. Inasmuch as during the setting action of the concrete the surfaces of the particles which are ultimately exposed are covered by the adhesive, the desired bright natural colors are not obscured by the cement and any cement which tends to protrude between particles is kept from hardening by reason of the "medication" and may be readily brushed away. During the setting action, the adhesive becomes sufficiently distended to readily release the aggregate particles and accordingly the backing and forms may be removed without danger of loosening the aggregate from the concrete.

Figure 2:
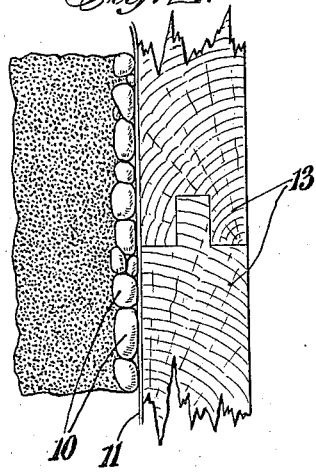
Fig. 2 is a sectional view taken through a block of concrete treated in accordance with this invention and before the forms have been removed.
Figure 3:
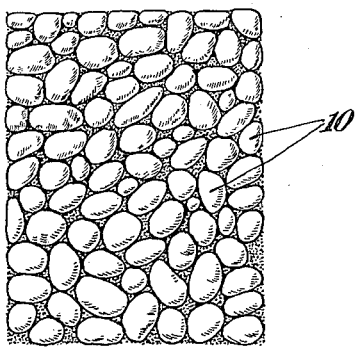
Fig. 3 is a front face view of a finished section of concrete treated in accordance with this invention.
Figure 4:
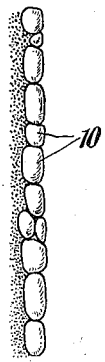
Fig. 4 is an edge view of the same.

The foregoing product with its method of use is indicated in the drawings wherein Fig. 1 shows the particles of the selected aggregate 10 secured to a fabric backing 11 by a suitable adhesive material 12. In Fig. 2 a section of the forms used for receiving concrete is indicated at 13. An area of the fabric backing 11, together with the layer of aggregate 10 thereon is secured to the inner face of the forms with the aggregate facing inwardly. A mass of concrete is indicated at 14 as poured against the layer of aggregate 10. After the concrete as at 14 has been allowed to harden, the forms 13, together with the fabric back 11, are removed as above stated. The resulting concrete surface is then suitably cleaned or allowed to weather and finally a finished surface as indicated in Fig. 3 is revealed. An edge view of the surface of Fig. 3 is indicated in Fig. 4. Inasmuch as the selected aggregate may be spread over the fabric backing in a uniform flat area, in the resulting structure the aggregate particles 10 will uniformly protrude out of the concrete mass, as indicated in Fig. 4. Thus a wall or other concrete structure of trim and finished appearance may be very readily constructed.

By means of this invention, therefore, a surface integrally formed with the concrete body and of substantially any color or appearance or degree of excellence, and substantially any desired texture may be produced independently of the type or class of concrete mixture or aggregate used in the main concrete body. Although in the drawings the product is illustrated as used upon a vertical wall, it will be understood that the same or similar products may be used in other types of construction, such as for instance, ceiling constructions where a fine or finished surface is desired as soon as the forms are stripped. It may also be used in top surface construction, such as on sidewalks, floors, porch floors and the like, by the simple expedient of pressing the fabric with the desired aggregate thereon down into the top surface while it is plastic and then allowing it to set and later stripping off the fabric backing. Also where it is desired to securely bond one section of a concrete structure to another section which is to be poured later, a rough surface for bonding purposes may be formed in accordance with this invention by selecting proper and clean aggregate particles which will fix themselves to the desired surfaces and make possible a durable bonding action.

As an aid in selecting the desirable adhesive colloidal vehicle and the proper "medication" substance for any particular purpose, reference may be had to my application Serial No. 37,625, filed June 17, 1925, Patent No. 1,637,321, entitled "Method of and composition for treating concrete", as to certain features of which this application is a continuation.

As to certain features of this specification pertaining to concrete top surfaces and traffic bearing surfaces, applicant's copending application Ser. No. 301,882, filed August 24, 1928, comprises a continuation in part, certain of such features being claimed therein.

While I have described my invention in considerable detail and with respect to a preferred form of product embodying the invention, and the preferred methods or processes for making and using the same, it will be understood by those skilled in the art, after having understood my invention, that various changes and modifications may be made without departing from the spirit and scope of the invention, and I aim in the appended claims to cover all such modifications and changes as come within the spirit of the invention.

What I claim as new and desire to secure by Letters Patent is:

1. A product of the class described for treating concrete surfaces or the like, comprising an area of flexible sheet material having one side covered with selected concrete aggregate material secured thereon by an adhesive, said adhesive including a substance having the property of inhibiting the normal setting action of a concrete mixture to a limited depth when applied to the surface thereof.

2. A product of the class described for treating concrete surfaces or the like, comprising a layer of selected concrete aggregate secured to a suitable base by an adhesive, said adhesive being relatively insoluble in rain water as compared with the alkaline waters extruded from wet concrete.

3. A product of the class described for treating concrete surfaces or the like, comprising a layer of selected concrete aggregate secured to a suitable base by an adhesive, said adhesive including a gum substance incorporated with medication for inhibiting the normal setting action of a concrete mixture to a limited depth when applied to the surface thereof.

4. The process of applying a layer of selected aggregate to the surfaces of concrete structures which comprises securing a layer of the aggregate to a suitable base by an adhesive, securing the base with the aggregate thereon upon the concrete forms, then pouring the concrete mixture into contact with the aggregate, allowing the concrete to at least partially set and then removing the forms together with said base and adhesive.

5. The process of applying a layer of selected aggregate to concrete surfaces which comprises securing a layer of the aggregate to a suitable base by an adhesive which is substantially insoluble in rain water but is affected by the alkaline waters extruded by wet concrete to release the aggregate, pouring the concrete mixture against the layer of aggregate, allowing the concrete to harden, and then removing said base.

6. The process of applying a layer of selected aggregate to concrete surfaces which comprises securing a layer of the aggregate to a suitable base by an adhesive including a substance for inhibiting the normal setting action of concrete, pouring the concrete mixture directly against the layer of aggregate, allowing the body of the concrete to harden while the concrete for a limited depth within the interstices of the layer of selected aggregate is inhibited from hardening, and then removing the base and adhesive and the releasable particles of treated concrete mixture.

7. A product of the class described for treating concrete surfaces or the like, comprising a layer of selected concrete aggregate secured to a suitable base by an adhesive, said adhesive being insoluble in rain water, but soluble in the alkaline waters extruded from wet concrete, said adhesive also including a gum substance incorporated with medication for inhibiting the normal setting action of a concrete mixture when applied to the surface thereof.

8. Process of applying a layer of colored particles to concrete surfaces which comprises securing a layer of the particles to a suitable base by an adhesive including a substance for inhibiting the normal setting action of concrete, applying this layer of particles to the concrete surface during the setting thereof, allowing the body of concrete to harden while the concrete for a limited depth within the interstices of the layer is inhibited from hardening, and then removing the base and adhesive and the releasable cement at the surface interstices.

9. Means for acting upon concrete surfaces during the setting thereof to eliminate from the concrete body the cement at the surface thereof and to produce colored effects thereon, which comprises a cement destroying composition associated with distinctively colored means to be transferred to the concrete surface, and a carrying medium for said colored means and composition, for retaining the same in position at the concrete surface during the setting thereof.

10. Means of the class described for treating concrete surfaces or the like comprising a thin layer of a cement destroying composition embodied with distinctively colored means, and a carrying medium for said colored means and composition, for retaining the same in position at the concrete surface during the setting thereof.

In testimony whereof I have signed my name to this specification.

NATHAN C. JOHNSON.